(12) United States Patent
Toko et al.

(10) Patent No.: US 10,486,737 B2
(45) Date of Patent: Nov. 26, 2019

(54) STEERING CONTROL DEVICE

(71) Applicants: JTEKT CORPORATION, Osaka-shi, Osaka (JP); DENSO CORPORATION, Kariya, Aichi-pref. (JP)

(72) Inventors: Takahiro Toko, Takahama (JP); Hiromasa Tamaki, Okazaki (JP); Akira Nambu, Okazaki (JP); Takahiro Kojo, Gotenba (JP); Nobuyori Nakajima, Kariya (JP)

(73) Assignees: JTEKT CORPORATION, Osaka (JP); DENSO CORPORATION, Kariya (JP)

( * ) Notice: Subject to any disclaimer, the term of this patent is extended or adjusted under 35 U.S.C. 154(b) by 117 days.

(21) Appl. No.: 15/788,326

(22) Filed: Oct. 19, 2017

(65) Prior Publication Data

US 2018/0118254 A1 May 3, 2018

(30) Foreign Application Priority Data

Oct. 28, 2016 (JP) ................. 2016-211736

(51) Int. Cl.
 *B62D 5/04* (2006.01)
(52) U.S. Cl.
 CPC ......... *B62D 5/0463* (2013.01); *B62D 5/0496* (2013.01)
(58) Field of Classification Search
 CPC ............................ B62D 5/0463; B62D 5/0496
 USPC .......................................................... 701/41
 See application file for complete search history.

(56) References Cited

U.S. PATENT DOCUMENTS

| 4,771,845 A * | 9/1988 | Shimizu ............... B62D 5/0463 180/446 |
| 7,091,686 B2 | 8/2006 | Kagei |
| 8,253,362 B2 * | 8/2012 | Sakamoto ............ B62D 5/0481 318/434 |
| 2015/0203147 A1 | 7/2015 | Kuramochi et al. |

FOREIGN PATENT DOCUMENTS

| JP | 2009-001279 A | 1/2009 |
| WO | 2008/032197 A1 | 3/2008 |

OTHER PUBLICATIONS

Mar. 16, 2018 Extended European Search Report issued in European Patent Application No. 17198500.5.

* cited by examiner

*Primary Examiner* — Marthe Y Marc-Coleman
(74) *Attorney, Agent, or Firm* — Oliff PLC (57) ABSTRACT

A steering control device has a steering actuator as an operation target, the steering actuator includes a motor and a steering mechanism mechanically connected to a rotary shaft of the motor. The steering control device includes a controller configured to perform i) a low-temperature process of changing a torque of the motor when an estimated value estimated from a temperature of a lubrication target part of the steering mechanism is equal to or lower than a predetermined value with respect to when the estimated value is higher than the predetermined value and ii) an estimation process of calculating the estimated value which is set be lower than a detected value of a temperature sensor detecting a temperature of a predetermined member attached to the steering mechanism based on a heat emission parameter of the steering actuator associated with a current flow with the detected value as an input.

7 Claims, 7 Drawing Sheets

STEERING CONTROL DEVICE

INCORPORATION BY REFERENCE

The disclosure of Japanese Patent Application No. 2016-211736 filed on Oct. 28, 2016 including the specification, drawings and abstract is incorporated herein by reference in its entirety.

BACKGROUND

1. Technical Field

The disclosure relates to a steering control device that has a steering actuator configured to turn turning wheels as an operation target.

2. Description of Related Art

For example, Japanese Patent Application Publication No. 2009-1279 (JP 2009-1279 A) describes a technique of setting an assist torque to be larger when the temperature of a gear part (a lubrication target part of a steering mechanism) of an electric power steering device (a steering actuator) is low than that when the temperature of the gear part is high in consideration of an increase in gear preload due to an increase in grease viscosity. JP 2009-1279 A also describes that a sensor or the like that directly detects a gear temperature is provided (Paragraph "0013").

SUMMARY

When a temperature sensor that directly detects the temperature of the lubrication target part of the steering mechanism is provided, there is a problem in that an increase in size of the lubrication target part is caused, or the like. On the other hand, the inventor found that, when a temperature sensor is disposed as close to the lubrication target portion as possible instead of directly detecting the temperature of the lubrication target part, a member close to the temperature sensor receives heat due to emission of heat resulting from a current flow in the steering actuator and there is a likelihood that the temperature detected by the temperature sensor will depart from the temperature of the lubrication target part.

The disclosure is made in consideration of such circumstances and provides a steering control device that can estimate a temperature of a lubrication target part of a steering mechanism with high accuracy even when a detected value of a temperature sensor is affected by emission of heat from a steering actuator resulting from a current flow therein.

A steering control device according to an aspect of the disclosure includes a steering actuator configured to turn turning wheels as an operation target. The steering actuator includes a motor and a steering mechanism mechanically connected to a rotary shaft of the motor. The steering control device includes a controller. The controller is configured to perform i) a low-temperature process of changing a torque of the motor when an estimated value estimated from a temperature of a lubrication target part of the steering mechanism is equal to or lower than a predetermined value with respect to when the estimated value estimated from the temperature of the lubrication target part of the steering mechanism is higher than the predetermined value and ii) an estimation process of calculating the estimated value which is set to be a value lower than a detected value of a temperature sensor detecting a temperature of a predetermined member attached to the steering mechanism based on a heat emission parameter of the steering actuator associated with a current flow with the detected value as an input.

There is a likelihood that the detected value of the temperature sensor will be higher than the temperature of the lubrication target part due to emission of heat from the steering actuator. Accordingly, in this aspect, the estimated value of the temperature of the lubrication target part is calculated to be lower than the detected value of the temperature sensor based on an amount of heat emitted from the steering actuator. According to the aspect, it is possible to estimate the temperature of the lubrication target part of the steering mechanism with high accuracy even when the detected value of the temperature sensor is affected by the emission of heat from the steering actuator.

The temperature sensor may satisfy at least one condition of a first condition that the temperature sensor is accommodated in a housing in which at least one of a voltage application circuit applying a voltage to the motor and the motor is accommodated, a second condition that a temperature of a predetermined member is detected, the predetermined member being the steering control device, and a third condition that the shorter distance of a distance between the motor and the temperature sensor and a distance between the voltage application circuit and the temperature sensor is shorter than a distance between the lubrication target part and the temperature sensor.

The steering control device operates the voltage application circuit and thus is likely to be disposed at a position which is easily affected by the heat of the voltage application circuit. Accordingly, in this aspect, the temperature sensor satisfies at least one condition of the first, second, and third conditions and thus is easily affected by the heat emitted from the voltage application circuit. Accordingly, in this aspect, the process of calculating the estimated value of the temperature of the lubrication target part to be a value lower than the detected value of the temperature sensor based on the amount of heat emitted from the steering actuator is particularly effective.

The estimation process may include a drive correction value calculating process. The drive correction value calculating process may include calculating a drive correction value when the heat emission parameter of the steering actuator is greater than a predetermined value to be greater than the drive correction value when the heat emission parameter of the steering actuator is equal to or less than the predetermined value, with the heat emission parameter which is one of a current flowing in the motor and a torque of the motor as an input. The estimation process may include calculating the estimated value while setting a calculating value, by which the estimated value calculated in the estimation process is less than the detected value, based on the drive correction value.

Heat emitted from the steering actuator can be transmitted to the lubrication target part as well as the vicinity of the temperature sensor. However, an increase in temperature of the lubrication target part is less than an increase in temperature in the vicinity of the temperature sensor due to diffusion of heat, a large heat capacity of the lubrication target part, or the like. A value, by which the increase in temperature in the vicinity of the temperature sensor is greater than the increase in temperature in the lubrication target part, is likely to increase as the amount of heat emitted increases and the increase in temperature in the vicinity of the temperature sensor increases. Accordingly, according to this aspect, it is possible to calculate the estimated value with high accuracy by setting the value, by which the estimated value of the temperature of the lubrication target part is lower than the detected value of the temperature sensor, based on the drive correction value when the amount of heat emitted is relatively large, which is greater than the drive correction value when the amount of heat emitted is relatively small.

The estimation process may include calculating a value which is equal to or less than one of a first value obtained by performing low-pass filtering on a subtracted value acquired by subtracting the drive correction value from the detected value, and a second value obtained by subtracting a value acquired by performing the low-pass filtering on the drive correction value from a value acquired by performing the low-pass filtering on the detected value as the estimated value.

Regarding the emission of heat from the steering actuator, a delay occurs in the increase in temperature in the lubrication target part due to the emission of heat and this delay is likely to be greater than the delay of the increase in temperature in the vicinity of the temperature sensor. Accordingly, when the subtracted value obtained by subtracting the drive correction value from the detected value increases due to the emission of heat, the subtracted value is likely to increase earlier than the actual temperature of the lubrication target part. Therefore, in this aspect, the delay of the increase in temperature in the lubrication target part is reflected in the estimated value by using the low-pass filtering.

When the estimation process is stopped by turning off the steering control device, the steering control device may perform a storing process of storing the estimated value, which is the estimated value at the time before the estimation process is stopped, in a storage unit. The estimation process may be restarted with startup of the steering control device. The estimation process may include a residual heat correcting process. When the detected value at the time of restarting the estimation process is greater than the estimated value stored during the storing process, the residual heat correcting process may include setting the calculating value, by which the estimated value calculated in the estimation process is less than the detected value, to be greater than that when the detected value at the time of restarting the estimation process is equal to or less than the estimated value stored during the storing process.

For example, when the steering control device is turned off immediately after the amount of heat emitted from the steering actuator has increased and then a time until the steering control device is started is short, the temperature in the vicinity of the temperature sensor may be excessively higher than the temperature of the lubrication target part. In this case, when the estimated value is calculated based on the detected value of the temperature sensor, there is a likelihood that the estimated value will be higher than the actual temperature of the lubrication target part. Therefore, in this aspect, it is possible to prevent the estimated value from becoming higher than the actual temperature of the lubrication target part by performing the residual heat correcting process.

The residual heat correcting process may include a residual heat correction value calculating process. The residual heat correction value calculating process may include calculating a value, which is obtained by performing the low-pass filtering on a value acquired by subtracting the estimated value stored in the storing process from the detected value at the time of restarting the estimation process, as a residual heat correction value. The residual heat correcting process may include setting the calculating value, by which the estimated value calculated in the estimation process is less than the detected value, based on the residual heat correction value.

For example, when the steering control device is turned off immediately after the amount of heat emitted from the steering actuator has increased and then a time until the steering control device is started is short, the temperature in the vicinity of the temperature sensor may be higher than the estimated value when the estimation process is stopped. Accordingly, in this aspect, the value, by which the detected value is greater than the temperature of the lubrication target part, is understood as a value obtained by subtracting the estimated value stored during the storing process from the detected value.

When the temperature in the vicinity of the temperature sensor is higher than the temperature of the lubrication target part at the time of restart due to an influence of the emission of heat (residual heat) at the time of driving the steering actuator because the time from stop to restart of the estimation process is short, the influence of the residual heat decreases with the lapse of time. Accordingly, in determining the value by which the estimated value is less than the detected value based on the residual heat correction value, it is preferable that the residual heat correction value be decreased with the lapse of time. In this aspect, this decrease is expressed by using the low-pass filtering.

The controller may further perform i) an outside air temperature acquiring process of acquiring an outside air temperature and ii) a determination process of determining to perform the residual heat correcting process when a value obtained by subtracting the outside air temperature acquired during the outside air temperature acquiring process from the detected value is greater than a predetermined value and determining not to perform the residual heat correcting process when the value obtained by subtracting the outside air temperature acquired during the outside air temperature acquiring process from the detected value is equal to or less than the predetermined value at the time of restarting the estimation process.

When a state in which the steering actuator is not driven is maintained, the temperature in the vicinity of the temperature sensor converges on the temperature of outside air. Accordingly, when a difference between the detected value of the temperature sensor and the outside air temperature is large, it is conceived that the elapsed time after the state, in which the steering actuator is not driven, is started is short. In this aspect, whether to perform the residual heat correcting process is determined based on the difference between the detected value and the outside air temperature at the time of restart.

The estimation process may include a startup correction value calculating process. The startup correction value calculating process may include calculating a startup correction value which is a value equal to or less than a predetermined upper limit value, with an elapsed time after the steering control device starts an operation of periodically turning on/off a switching element of the voltage application circuit as an input. The startup correction value calculating process may also include setting the upper limit value as the startup correction value when the elapsed time is equal to or greater than a prescribed time. The estimation process may include calculating the estimated value while setting the calculating value, by which the estimated value calculated in the estimation process is less than the detected value, based on the startup correction value and the drive correction value.

In a case in which the motor is controlled such that a torque of the motor is zero by periodically turning on/off a switching element of the voltage application circuit, heat is emitted by the turning-on/off operation of the switching element even when a current does not flow in the motor. The increase in temperature in the lubrication target part is likely to be less than the increase in the detected value due to the emission of heat in this case. Therefore, in this aspect, a difference between the increase in temperature in the vicinity of the temperature sensor and the increase in temperature in the lubrication target part due to the turning-on/off operation of the switching element is expressed based on the startup correction value. Here, in this aspect, since the drive correction value is separately provided, the startup correction value does not include emission of heat due to driving of the motor but expresses the increase in temperature due to the emission of heat resulting from the turning-on/off operation of the switching element. Since the amount of heat emitted due to the turning-on/off operation of the switching element does not vary greatly, a variation of the increase in temperature can be considered to be small. Accordingly, in this aspect, the startup correction value is set to a value which is fixed to an upper limit value with the lapse of time.

The steering mechanism may include a rack shaft. A part of the rack shaft may be the lubrication target part. The rack shaft and the temperature sensor may be accommodated in the same space which is defined by a vehicle body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
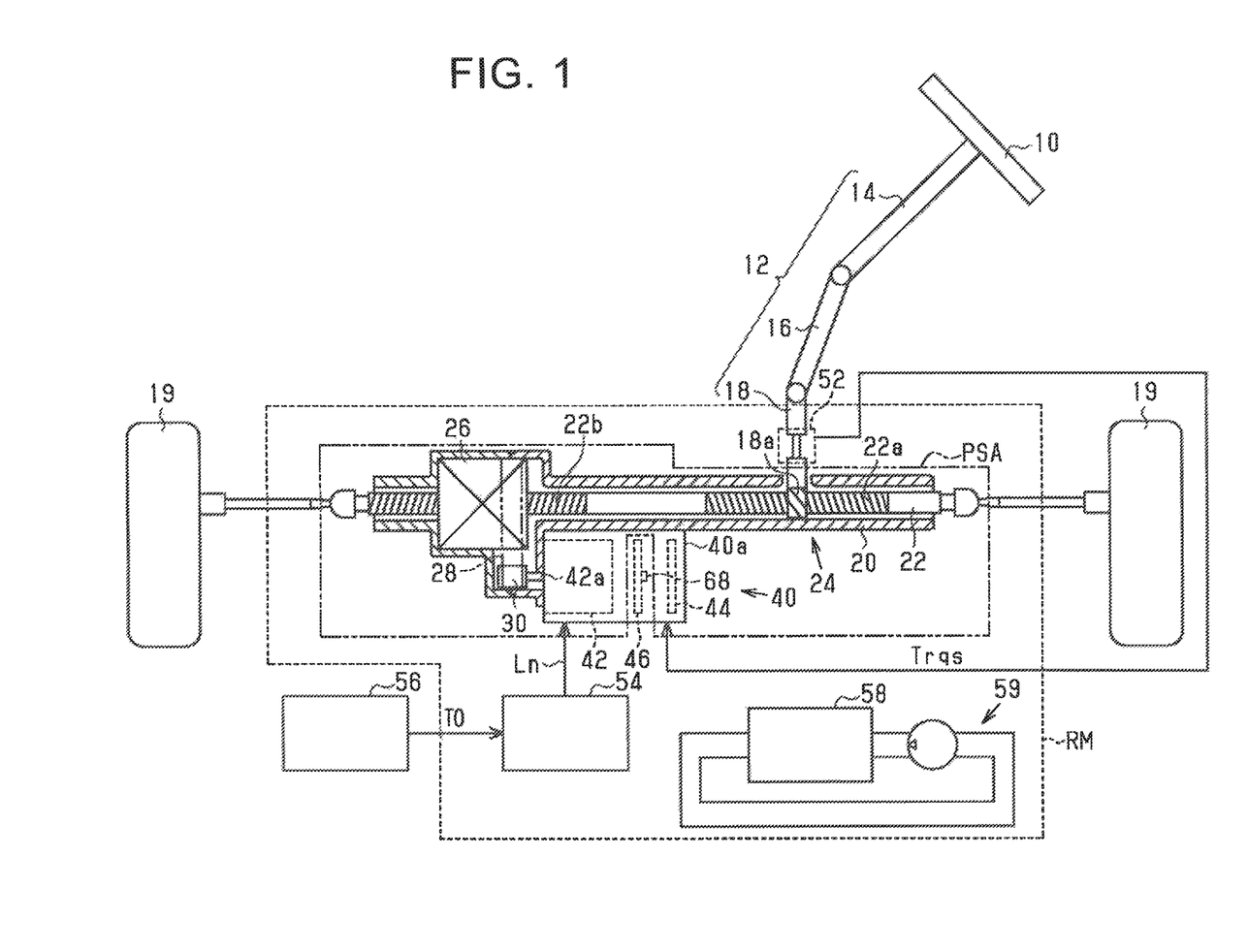
FIG. 1 is a diagram illustrating a steering system including a steering control device according to a first embodiment.

Hereinafter, a steering control device according to a first embodiment will be described with reference to the accompanying drawings. FIG. 1 illustrates an electric power steering system including a steering control device according to the first embodiment. A steering wheel (a steering 10) illustrated in FIG. 1 is connected to a steering shaft 12 including a column shaft 14, an intermediate shaft 16, and a pinion shaft 18. The pinion shaft 18 is disposed at a predetermined cross angle with a rack shaft 22, and constitutes a rack-and-pinion mechanism 24 along with the rack shaft 22. In the rack-and-pinion mechanism 24, first rack teeth 22a formed on the rack shaft 22 and pinion teeth 18a formed on the pinion shaft 18 engage with each other. The rack shaft 22 is supported by a rack housing 20 and turning wheels 19 are connected to both ends of the rack shaft 22 via tie rods.

Second rack teeth 22b are formed in a part of the rack shaft 22 other than the part in which the first rack teeth 22a are formed, and a part of the part in which the second rack teeth 22b are formed is inserted into a ball screw mechanism 26. The ball screw mechanism 26 includes a housing (a ball screw nut) and balls which are disposed between a thread groove of the ball screw nut and the second rack teeth 22b. The ball screw nut is configured to be rotatable along with a pulley 30 by a timing belt 28. The pulley 30 is connected to a rotary shaft 42a of a motor 42 accommodated in a motor unit 40. The pulley 30 rotates with rotation of the rotary shaft 42a of the motor 42 and the ball screw nut of the ball screw mechanism 26 is rotated by the timing belt 28 in association with the rotation. Accordingly, the rack shaft 22 is linearly displaced in an axial direction. In this embodiment, a surface permanent magnet synchronous motor (SPMSM) is used as an example of the motor 42.

The motor unit 40 includes a drive board 44 in which an inverter applying an AC voltage to the motor 42 is formed and a control board 46 constituting the steering control device operating the inverter, in addition to the motor 42. The motor unit 40 has a configuration in which the motor 42, the drive board 44, and the control board 46 are accommodated in one housing (a housing 40a). The motor unit 40 is attached to the rack housing 20 in the vicinity of the rack shaft 22 and the ball screw mechanism 26.

Figure 2:
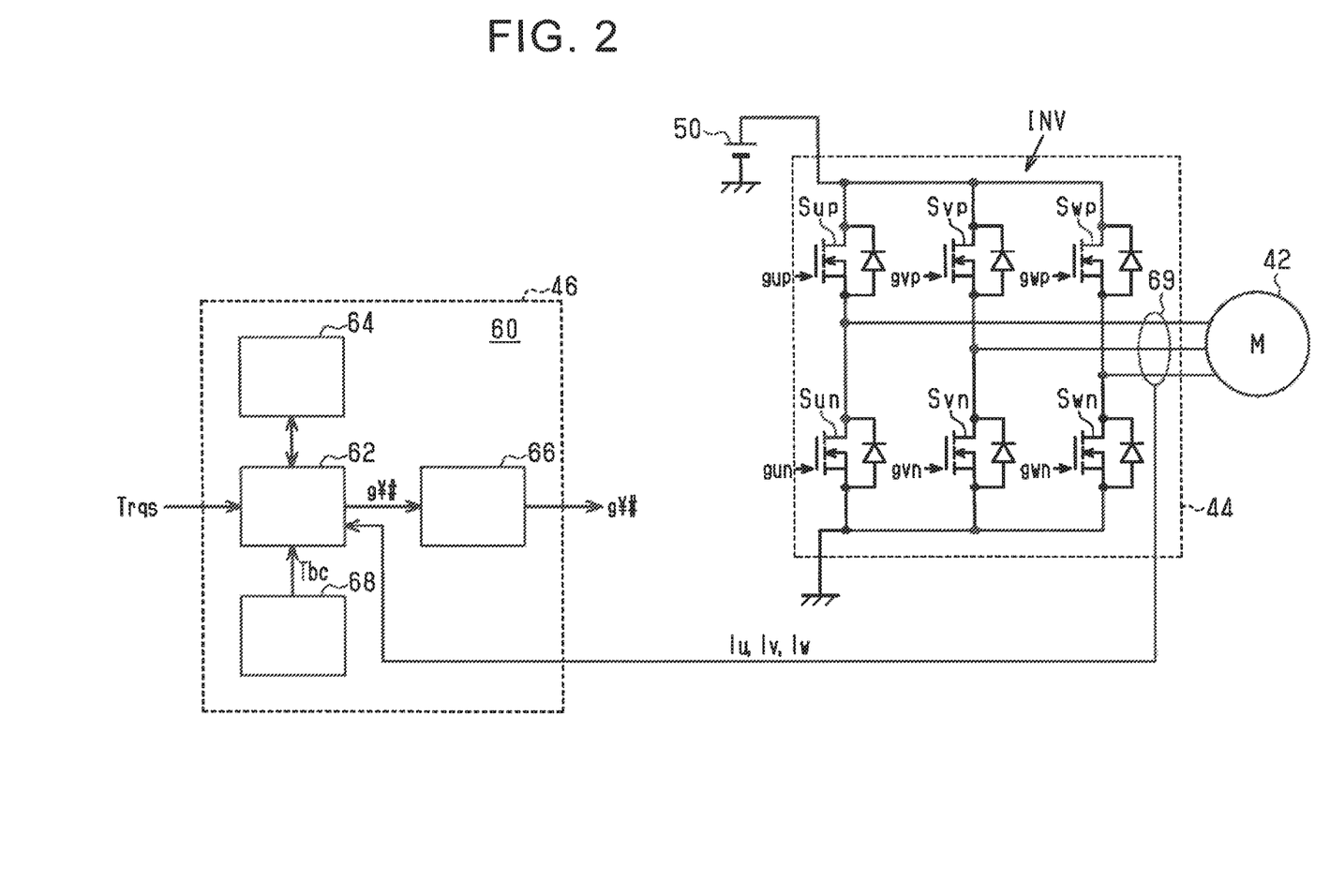
FIG. 2 is a diagram illustrating a control board and a drive board according to the first embodiment.

FIG. 2 illustrates a configuration of the drive board 44 and the control board 46. As illustrated in FIG. 2, an inverter INV is mounted on the drive board 44. The inverter INV includes switching elements Sup, Svp, and Swp for connecting a positive electrode of a DC voltage source (a battery 50) to a terminal of the motor 42 and switching elements Sun, Svn, and Swn for connecting a negative electrode of the battery 50 to a terminal of the motor 42. In the following description, "¥" is used for collectively describing "u, v, and w" which respectively indicate a U phase, a V phase, and a W phase of the inverter INV, and "#" is used for collectively describing "p and n" which respectively indicate an upper arm and a lower arm. That is, the inverter INV includes three sets of series connection assemblies of a switching element S¥p of the upper arm and a switching element S¥n of the lower arm.

A central processing unit (a CPU 62) that generates an operation signal g¥# of each switching element S¥# of the inverter INV, a memory 64, a driver 66 that converts a voltage value of the operation signal g¥# generated by the CPU 62 and outputs the converted voltage value to the inverter INV, and a thermistor 68 that detects the temperature of the control board 46 are mounted on the control board 46. The control board 46 and components mounted on the control board 46 constitute a steering control device (ECU 60).

A current sensor 69 that detects an output line current (an actual current i¥) of the inverter INV is provided on the drive board 44, and the actual current i¥ detected by the current sensor 69 is input to the ECU 60.

As illustrated in FIG. 1, an output value of a torque sensor 52 that detects a torque (a steering torque Trqs) input to the steering 10 is input to the ECU 60. The ECU 60 can communicate with another ECU 54 in the vehicle on which a steering actuator PSA is mounted via a communication line Ln. The other ECU 54 receives an outside air temperature TO which is detected by an outside air temperature sensor 56.

In this embodiment, the rack-and-pinion mechanism 24, the ball screw mechanism 26, the timing belt 28, the pulley 30, the motor 42, and the inverter INV constitute the steering actuator PSA. Particularly, the rack-and-pinion mechanism 24 and the ball screw mechanism 26 correspond to a steering mechanism that operates to turn the turning wheels 19 using the steering torque Trqs input to the motor 42 or the steering 10 as a drive source. The steering actuator PSA, the ECU 60, and the like are accommodated in a steering system accommodating chamber RM forming a space other than a passenger compartment which is a space including seats among spaces defined by a vehicle body. Accordingly, the thermistor 68 is accommodated in the same vehicle body space as the vehicle body space in which the steering actuator PSA is accommodated. In this embodiment, an on-board motor 58 that generates a rotary force of driving wheels for causing the vehicle to travel and a cooling system 59 for the on-board motor 58 or the like are accommodated in the steering system accommodating chamber RM. When the on-board motor 58 is an engine, the steering system accommodating chamber RM is a so-called engine compartment.

Figure 3:
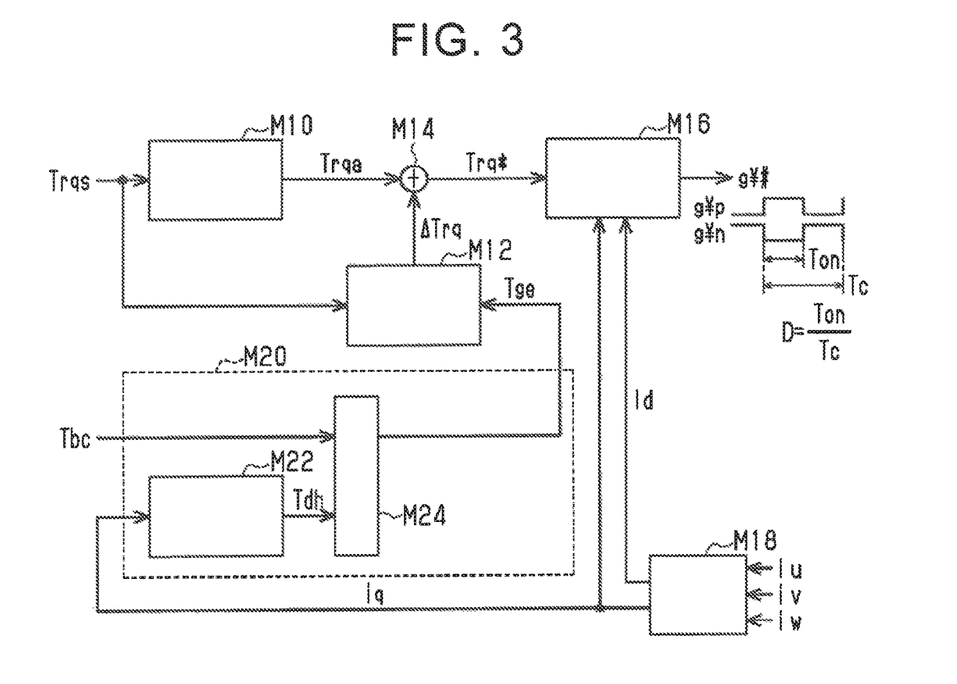
FIG. 3 is a block diagram illustrating a part of an operation signal generating process according to the first embodiment.

FIG. 3 illustrates a part of a process flow which is performed by the CPU 62 in accordance with a program stored in the memory 64 in the ECU 60. An assist torque setting unit M10 sets an assist torque Trqa for assisting operation of the steering 10 based on the steering torque Trqs. Specifically, the assist torque setting unit M10 sets the absolute value of the assist torque Trqa to be larger when the absolute value of the steering torque Trqs is relatively large than when the absolute value of the steering torque is relatively small.

A low-temperature correction value calculating unit M12 calculates a low-temperature correction value ΔTrq for correcting an increase in magnitude (absolute value) of the assist torque Trqa when the temperature of a lubrication target part of the steering mechanism including the rack-and-pinion mechanism 24 and the ball screw mechanism 26 is low. The low-temperature correction value ΔTrq has a dimension of a torque. Here, the lubrication target part includes the second rack teeth 22b and a part of the ball screw mechanism 26 coming in contact therewith. The lubrication target part is coated with grease for lubrication. The viscosity of the grease increases remarkably at a temperature equal to or lower than a predetermined low temperature (for example, equal to or lower than zero degrees). Accordingly, a so-called gear preload increases due to an increase in resistance of the lubrication target part and the torque of the motor 42 or the steering torque Trqs required for turning the turning wheels 19 at a predetermined angle is larger than that at a high temperature. Accordingly, in order to prevent the assist torque for assisting the operation of the steering 10 from being insufficient during driving, the low-temperature correction value ΔTrq is calculated when the temperature of the lubrication target part is equal to or lower than a low-temperature process execution temperature. Here, the low-temperature process execution temperature is set to, for example, a value equal to or lower than zero degrees. The low-temperature correction value ΔTrq compensates for insufficiency of the assist torque Trqa and thus becomes zero when the steering torque Trqs is zero. The low-temperature correction value calculating unit M12 performs a process of determining whether to set the low-temperature correction value ΔTrq to zero with the steering torque Trqs as an input or a process of determining the sign of the low-temperature correction value ΔTrq.

A torque correcting unit M14 corrects the assist torque Trqa by adding the low-temperature correction value ΔTrq to the assist torque Trqa, and outputs the corrected assist torque as a torque command value Trq*. When the low-temperature correction value ΔTrq is not output, the torque correcting unit M14 sets the assist torque Trqa as the torque command value Trq*.

An operation signal generating unit M16 generates and outputs an operation signal g¥# of the inverter INV for matching the torque of the motor 42 with the torque command value Trq* with the torque command value Trq* as an input. Here, in order to realize minimum-current maximum torque control, a d-axis current command value id* is set to zero, a q-axis current command value iq* is set depending on the torque command value Trq*, an operation signal g¥# for controlling d-axis and q-axis actual currents id and iq to the current command values id* and iq* is generated, and the generated operation signal is output to the inverter INV via the driver 66. Specifically, as an operation amount for feedback-controlling the actual currents id and iq to match the current command values id* and iq*, command values of the output line voltage (voltage command values vu*, vv*, and vw*) of the inverter INV are calculated. The switching element S¥p and the switching element S¥n are alternately turned on in a period Tc, and A duration of time in which the switching element S¥p is turned on in one period Tc is referred to as Ton as shown in FIG. 3. A time ratio D of the duration of time Ton to the period Tc is set such that the output line voltage of the inverter INV is the voltage command values vu*, vv*, and vw*. The operation signal g¥# is an operation signal for turning on/off the switching element S¥# depending on the time ratio D. The actual currents id and iq are obtained by converting the actual current i¥ detected by the current sensor 69 into currents on the d and q axes by a d-q conversion unit M18.

The low-temperature correction value calculating unit M12 calculates the low-temperature correction value ΔTrq based on an estimated value Tge with the estimated value Tge of the temperature of the lubrication target part output from an estimation unit M20 as an input. The process of the estimation unit M20 will be described below.

The estimation unit M20 calculates the estimated value Tge based on a detected value Tbc of the temperature of the control board 46. The control board 46 is disposed in the vicinity of the lubrication target part in the rack shaft 22 and the ball screw mechanism 26 and has a surrounding environment similar to that of the lubrication target part. That is, both are present in the steering system accommodating chamber RM and are similar to each other in an influence of traveling wind depending on a traveling speed of the vehicle as well as in an atmosphere temperature. They are similar to each other in that both are easily affected by radiant heat from the on-board motor 58 or radiant heat from the cooling system 59. Accordingly, the detected value Tbc of the temperature of the control board 46 has a correlation with the temperature of the lubrication target part. Since the thermistor 68 is closer to the motor 42 and the inverter INV than the lubrication target part as illustrated in FIG. 1 and is accommodated in the same housing as them, an influence of heat generated by driving of the steering actuator PSA can be more remarkable. Therefore, in this embodiment, the estimated value Tge is calculated by correcting the detected value Tbc as a base using emission of heat from the steering actuator PSA when estimating the temperature of the lubrication target part.

Specifically, a drive correction value calculating unit M22 calculates and outputs a drive correction value Tdh with the actual current iq as an input. Here, the drive correction value Tdh is a correction value for compensating for a difference between an increase in temperature of the control board 46 due to emission of heat from the steering actuator PSA and an increase in temperature of the lubrication target part and has a value equal to or greater than zero. The drive correction value Tdh has a dimension of a temperature.

Figure 4:
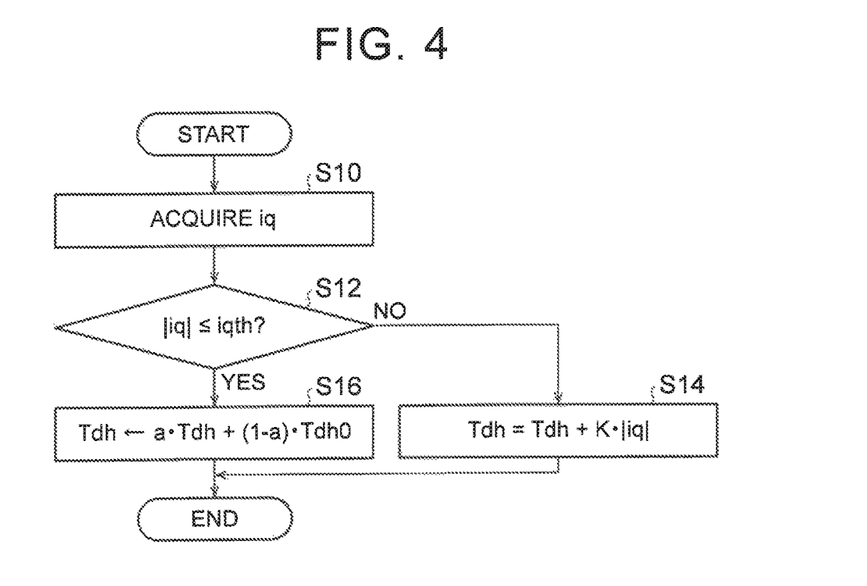
FIG. 4 is a flowchart illustrating a process flow which is performed by a drive correction value calculating unit according to the first embodiment.

FIG. 4 illustrates a process flow which is performed by the drive correction value calculating unit M22. The process flow illustrated in FIG. 4 is realized by causing the CPU 62 to repeatedly execute the program stored in the memory 64 at predetermined periodic time. Hereinafter, a step number is described as a numeral with "S" added to the head thereof.

In the process flow illustrated in FIG. 4, first, the CPU 62 acquires a q-axis actual current iq as a parameter indicating an amount of heat emitted from the steering actuator PSA (S10). Then, the CPU 62 determines whether the absolute value of the actual current iq is equal to or less than a threshold value iqth (S12). This process is for determining whether a current flowing in the motor 42 or the inverter INV is small enough to ignore an increase in temperature of the control board 46. Then, when the absolute value of the actual current iq is greater than the threshold value iqth (NO in S12), the CPU 62 corrects the drive correction value Tdh to increase by "K·|iq|" (S14). Here, the coefficient K has a positive value. On the other hand, when the absolute value of the actual current iq is equal to or less than the threshold value iqth (YES in S12), the CPU 62 updates the drive correction value Tdh to an index moving average value of a reference value Tdh0 and the drive correction value Tdh calculated in the previous period (S16). That is, the drive correction value Tdh is updated to "α·Tdh+(1−α)·Tdh0" using a coefficient α which is greater than "0" and less than "1." Here, the reference value Tdh0 has a value for defining a minimum value of the drive correction value Tdh. In this embodiment, the reference value Tdh0 is set to zero.

When the processes of S14 and S16 are completed, the CPU 62 temporarily ends the process flow illustrated in FIG. 4. Referring to FIG. 3 again, a temperature correcting unit M24 outputs a value obtained by subtracting the drive correction value Tdh from the detected value Tbc as an estimated value Tge. The process flow illustrated in FIG. 3 is performed on the condition that the CPU 62 is in an ON state. Here, when a command to set the vehicle to a state in which travel is possible is issued by a user, the CPU 62 is in the ON state. On the other hand, when a command to set the vehicle to a state in which travel is not possible is issued by the user, the CPU 62 maintains the ON state of the CPU 62 for a predetermined period (several minutes to several tens of minutes herein) and then switches the CPU 62 to an OFF state. Even when the ON state is maintained, the process of calculating the estimated value Tge is performed. In addition, the drive correction value Tdh is initialized regardless of the value when the previous calculation process ends, with the restart of the process of calculating the estimated value Tge. The command to set the vehicle to a state in which travel is possible is issued by an operation of turning on an ignition switch, for example, when the on-board motor includes an engine.

Effects of this embodiment will be described below. When a steering torque Trqs is detected by steering the steering 10, an assist torque Trqa is set depending on the steering torque Trqs. When the estimated value Tge of the temperature of the lubrication target part is equal to or lower than the low-temperature process execution temperature, a value, to which the assist torque Trqa is corrected by using the low-temperature correction value ΔTrq, is set as the torque command value Trq*, and the inverter INV is operated by the ECU 60 such that the torque of the motor 42 is set as the torque command value Trq*.

Accordingly, when a current flows in the inverter INV and the motor 42, the temperature of the control board 46 increases by an influence of emission of heat from the motor 42 and the inverter INV. Heat caused by the foregoing emission of heat is transmitted to the lubrication target part, but since the heat is not applied directly to the control board 46 and the heat capacity of the lubrication target part is great, an increase in temperature of the lubrication target part is smaller than the increase in temperature of the control board 46. Therefore, in this embodiment, a value obtained by subtracting the drive correction value Tdh from the detected value Tbc of the temperature is set as the estimated value Tge in consideration of the increase in temperature of the control board 46. Accordingly, even when the detected value Tbc is affected by the emission of heat from the steering actuator PSA resulting from a current flow, it is possible to estimate the temperature of the lubrication target part with high accuracy.

According to the above-mentioned embodiment, the following advantages can be further achieved. The control board 46 on which the thermistor 68 is mounted is accommodated in the motor unit 40. Accordingly, in this embodiment, since the control board 46 and the thermistor 68 are closer to the inverter INV or the motor 42 than the lubrication target part and are disposed in the same housing and thus are directly affected by the emission of heat from the inverter INV or the motor 42, the temperature of the control board 46 and the thermistor 68 is more likely to increase than the temperature of the lubrication target part. Accordingly, it is particularly effective to perform correction using the drive correction value Tdh. Since the estimated value Tge is calculated by using the thermistor 68 that detects the temperature of the control board 46, it is possible to obtain temperature information of the lubrication target part without providing a new sensor.

A second embodiment will be described below with a focus on differences from the first embodiment with reference to the drawings.

Figure 5:
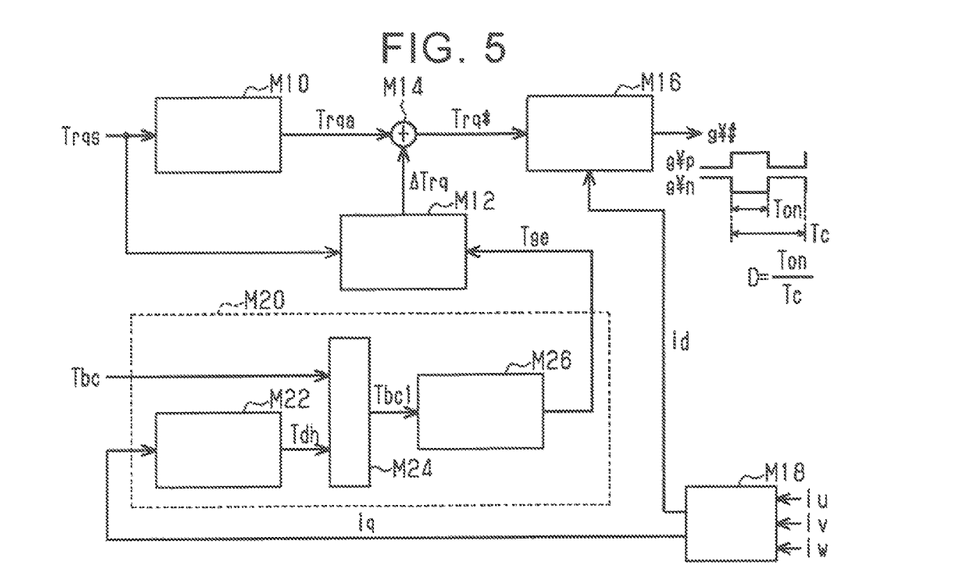
FIG. 5 is a block diagram illustrating a part of an operation signal generating process according to a second embodiment.

FIG. 5 illustrates a part of a process flow which is performed by the CPU 62 in accordance with a program stored in the memory 64 in the ECU 60 according to this embodiment. In FIG. 5, the processes corresponding to the process flow illustrated in FIG. 3 will be referenced by the same reference signs and description thereof will not be repeated.

As illustrated in FIG. 5, in this embodiment, a value obtained by performing low-pass filtering on the output value Tbc1 of the temperature correcting unit M24 by using a low-pass filtering unit M26 is output as the estimated value Tge. For example, a primary delay filter or a secondary delay filter can be used for the low-pass filtering.

When an amount of heat emitted from the motor 42 or the inverter INV increases and the temperature (the detected value Tbc) of the control board 46 increases greatly, the output value Tbc1 also increases to a certain extent, but in this embodiment, a value, which is obtained by delaying an increase rate thereof by the low-pass filtering unit M26, is used as the estimated value Tge. Accordingly, a delay of the increase in temperature of the lubrication target part with respect to the increase in temperature of the control board 46 can be reflected in the estimated value Tge.

Hereinafter, a third embodiment will be described below with a focus on differences from the second embodiment with reference to the drawings.

Figure 6:
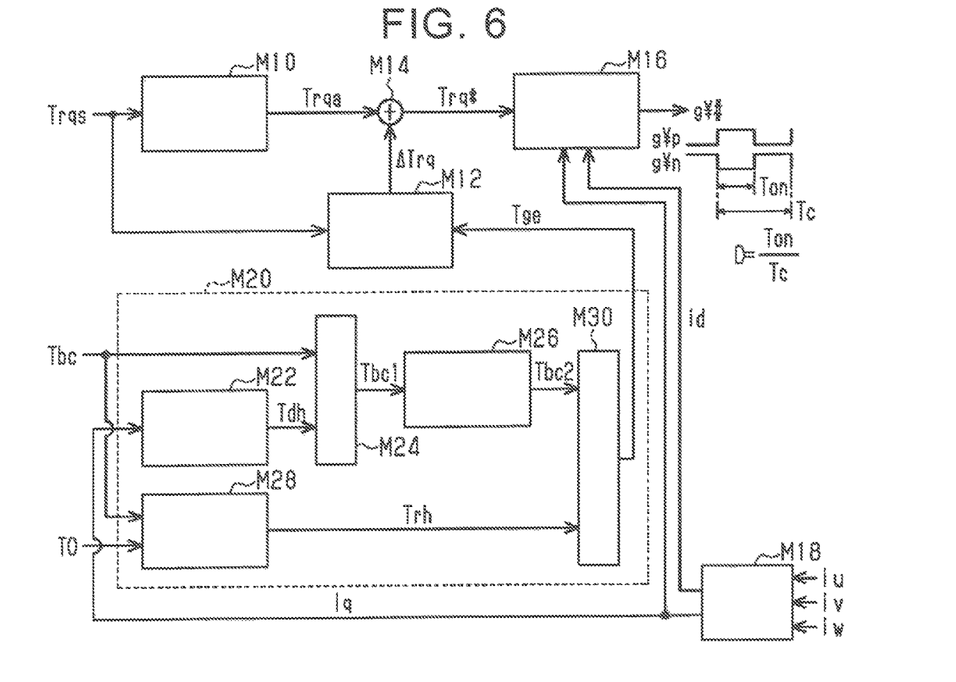
FIG. 6 is a block diagram illustrating a part of an operation signal generating process according to a third embodiment.

FIG. 6 illustrates a part of a process flow which is performed by the CPU 62 in accordance with a program stored in the memory 64 in the ECU 60 according to this embodiment. In FIG. 6, the processes corresponding to the process flow illustrated in FIG. will be referenced by the same reference signs and description thereof will not be repeated.

In this embodiment, a residual heat correction value calculating unit M28 outputs a residual heat correction value Trh, and a temperature correcting unit M30 sets a value obtained by subtracting the residual heat correction value Trh from an output value Tbc2 of the low-pass filtering unit M26 as the estimated value Tge. The residual heat correction value Trh has a dimension of a temperature.

Figure 7:
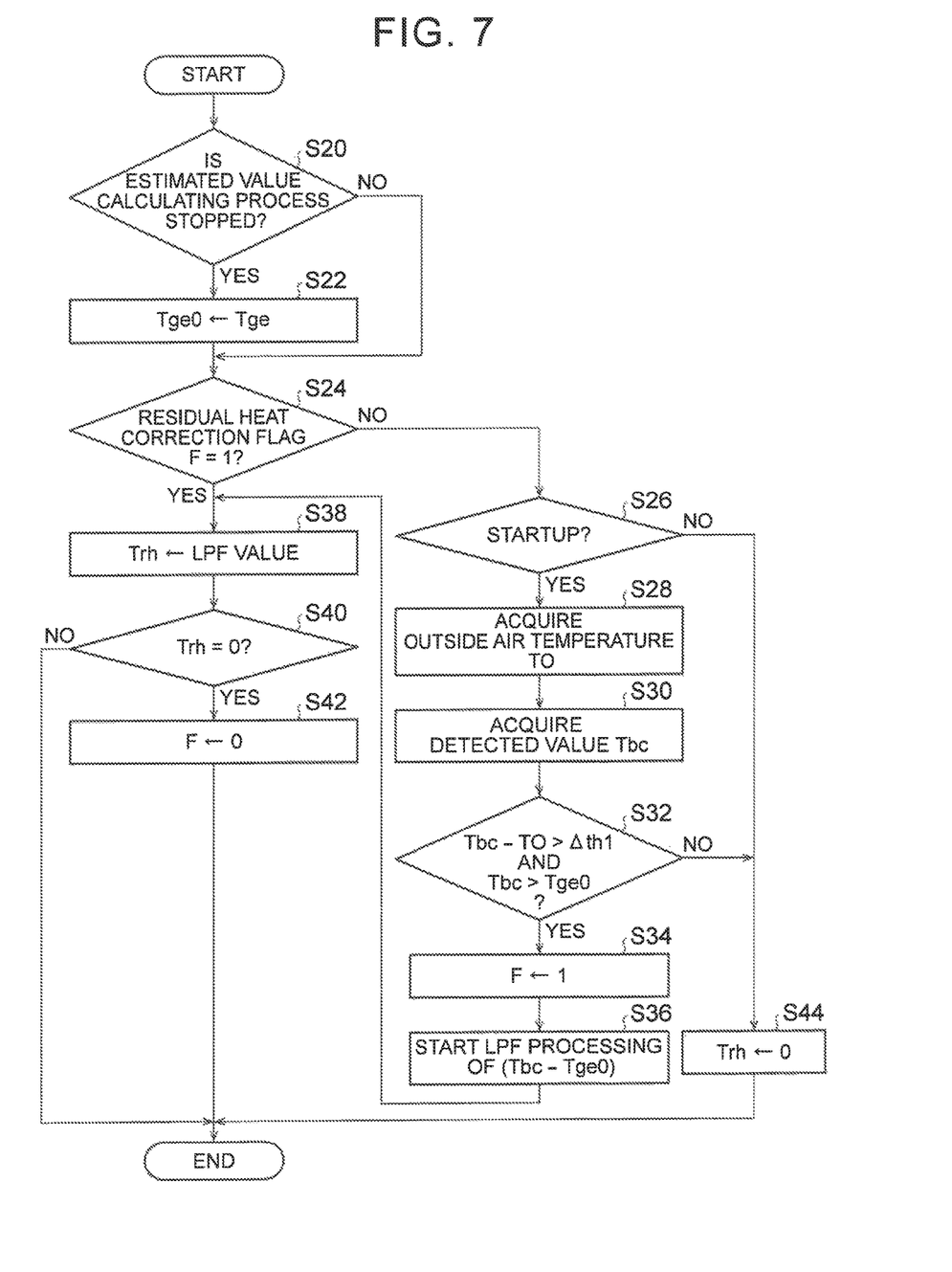
FIG. 7 is a flowchart illustrating a process flow which is performed by a residual heat correction value calculating unit according to the third embodiment.

FIG. 7 illustrates a process flow which is performed by the residual heat correction value calculating unit M28. The process flow illustrated in FIG. 7 is realized by causing the CPU 62 to repeatedly execute a program stored in the memory 64 at predetermined periodic time.

In the process flow illustrated in FIG. 7, the CPU 62 first determines whether the process of calculating the estimated value is stopped (S20). When it is determined that the process is stopped (YES in S20), the CPU 62 substitutes an initial value Tge0 which has been finally calculated before the calculation process is stopped for the initial value Tge0 of the estimated value Tge and stores the initial value Tge0 in the memory 64 (S22). Then, the CPU 62 determines whether a residual heat correction flag F is "1" (S24). Here, the residual heat correction flag F indicates that a correction process based on residual heat is performed when it is set to "1" and that the correction process is not performed when it is set to "0." Here, residual heat refers to heat which is still held by the control board 46 at the time of restarting the process of calculating the estimated value Tge among the heat resulting from driving of the steering actuator PSA or the like. When the ECU 60 is switched to the OFF state, the control board 46 is changed to a thermal equilibrium state with outside air and thus the temperature of the control board 46 converges with the outside air temperature TO, which is similar to the temperature of the lubrication target part. However, for example, when the motor 42 generates a large torque for parking or the like immediately before the vehicle is switched to the state in which travel is not possible and a period in which the ECU 60 is in the OFF state is short, there is a likelihood that the detected value Tbc at the time of restarting the process of calculating the estimated value Tge will be higher than the temperature of the lubrication target part. However, in the process flow illustrated in FIG. 6, since the drive correction value Tdh is initialized at the time of restarting the process of calculating the estimated value Tge, deterioration in accuracy of the estimated value Tge due to the residual heat cannot be compensated for depending on the drive correction value Tdh. The correction process due to the residual heat is a process of compensating for a difference when the estimated value Tge is higher than the detected value Tbc due to the residual heat.

When the residual heat correction flag F is determined to be "0" (NO in S24), the CPU 62 determines whether the ECU 60 is in the ON state (S26). When it is determined that the ECU 60 is in the ON state (YES in S26), the CPU 62 acquires the outside air temperature TO by communicating with the other ECU 54 via the communication line Ln (S28). The CPU 62 also acquires the detected value Tbc (S30). The detected value Tbc is a value at the time of restarting the process of calculating the estimated value Tge. Then, the CPU 62 determines whether the logical conjunction of a condition that a value obtained by subtracting the outside air temperature TO from the detected value Tbc is greater than a predetermined value Δth1 and a condition that the detected value Tbc is greater than the initial value Tge0 is true (S32). This process is a process of determining whether to perform correction based on the residual heat correction value Trh. Here, the condition that the value obtained by subtracting the outside air temperature TO from the detected value Tbc is greater than the predetermined value Δth1 is a condition that a period from stopping of the process of calculating the estimated value Tge to restarting of the process is short.

When it is determined that the logical conjunction is true (YES in S32), the CPU 62 sets the residual heat correction flag F to "1" (S34). Then, the CPU 62 starts low-pass filtering (LPF processing) of the value obtained by subtracting the initial value Tge0 from the detected value Tbc acquired in S30 (S36). This process is a process using the value obtained by subtracting the initial value Tge0 from the detected value Tbc as an impulse input of a low-pass filter. In this embodiment, a primary delay filter is exemplified as the low-pass filter in S36. Then, when it is determined that the residual heat correction flag F is "1" (YES in S24) or when the process of S36 is completed, the CPU 62 sets the value subjected to the low-pass filtering (LPF value) as the residual heat correction value Trh (S38). The value subjected to the low-pass filtering is an impulse response to a primary delay system and thus decreases gradually. This represents that an influence of the residual heat is attenuated.

Then, the CPU 62 determines whether the residual heat correction value Trh is zero (S40). This process is for determining whether to stop a correction process based on the residual heat. In other words, this process is for determining whether to stop a process of setting a value by which the estimated value Tge is less than the detected value Tbc based on the residual heat correction value Trh. When it is determined that the residual heat correction value is zero (YES in S40), the CPU 62 sets the residual heat correction flag F to "0" (S42).

On the other hand, when it is determined that the ECU is not in the ON state (NO in S26) or when it is determined that the foregoing logical conjunction is not true (NO in S32), the CPU 62 does not perform the correction process based on the residual heat and thus sets the residual heat correction value Trh to zero (S44).

When the processes of S42 and S44 are completed or when the determination result of S40 is negative, the CPU 62 temporarily stops the process flow illustrated in FIG. 7.

Effects of this embodiment will be described below.

When a user gives a command to set the vehicle to a state in which travel is not possible immediately after greatly turning the steering 10 and parking the vehicle, the CPU 62 continuously performs the process flow illustrated in FIG. 6 for a predetermined period, then stores the estimated value Tge as the initial value Tge0 in the memory 64, and switches itself to the OFF state. Accordingly, the temperature of the control board 46 or the temperature of the lubrication target part converges on the outside air temperature TO. Here, when a command to set the vehicle to a state in which travel is possible is issued early, the temperature of the control board 46 still exhibits a high value due to an influence of heat at the time of parking and thus is excessively higher than the temperature of the lubrication target part. At this time, the CPU 62 can remove the influence of the residual heat from the estimated value Tge by calculating the estimated value Tge based on a value obtained by subtracting the residual heat correction value Trh form the output value Tbc2.

Hereinafter, a fourth embodiment will be described below with a focus on differences from the third embodiment with reference to the drawings.

Figure 8:
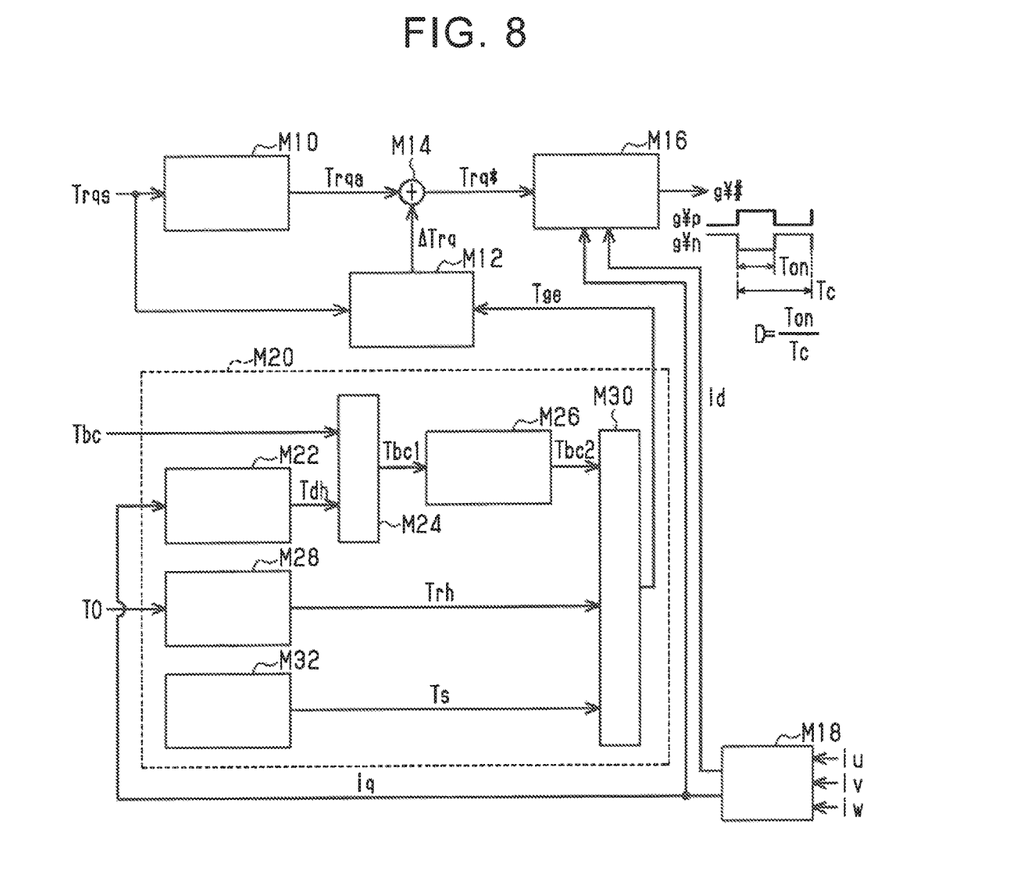
FIG. 8 is a block diagram illustrating a part of an operation signal generating process according to a fourth embodiment.

FIG. 8 illustrates a part of a process flow which is performed by the CPU 62 in accordance with a program stored in the memory 64 in the ECU 60 according to this embodiment. In FIG. 8, the processes corresponding to the process flow illustrated in FIG. 6 will be referenced by the same reference signs and description thereof will not be repeated.

As illustrated in FIG. 8, in this embodiment, a startup correction value calculating unit M32 calculates a startup correction value Ts, and a temperature correcting unit M30 outputs a value obtained by subtracting the residual heat correction value Trh and the startup correction value Ts from the output value Tbc2 of the low-pass filtering unit M26 as the estimated value Tge. The startup correction value Ts has a dimension of a temperature.

Figure 9:
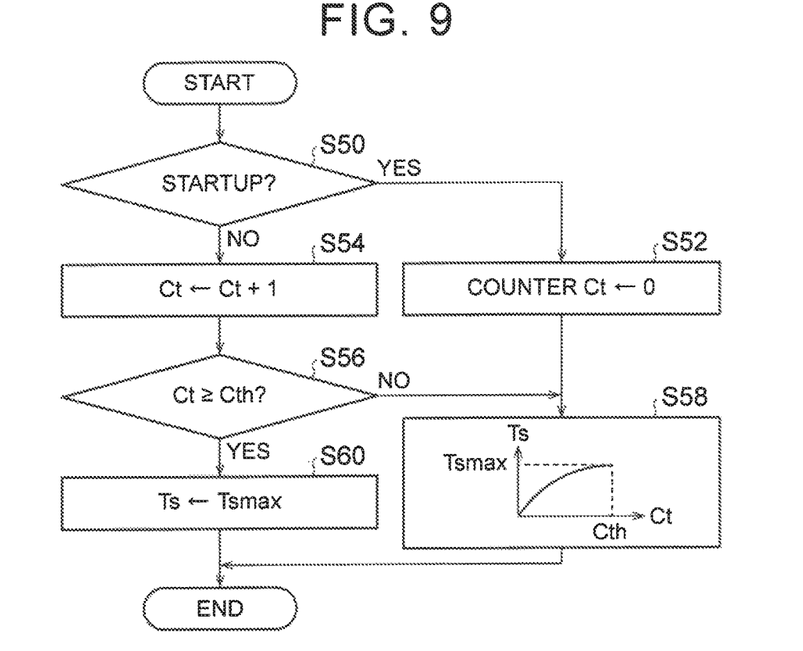
FIG. 9 is a flowchart illustrating a process flow which is performed by a startup correction value calculating unit according to the fourth embodiment.

FIG. 9 illustrates a process flow which is performed by the startup correction value calculating unit M32. The process flow illustrated in FIG. 9 is realized by causing the CPU 62 to repeatedly execute a program stored in the memory 64 at predetermined periodic time.

In the process flow illustrated in FIG. 9, first, the CPU 62 determines whether the ECU 60 is started (S50). When it is determined that the ECU is started (YES in S50), the CPU 62 initializes a counter Ct that counts the time from the starting time (S52). On the other hand, when it is determined that the ECU is not started (NO in S50), the CPU 62 increments the counter Ct (S54). Then, the CPU 62 determines whether the value of the counter Ct is equal to or greater than a prescribed value Cth (S56).

When the process of S52 is completed or when the determination result of S56 is negative, the CPU 62 calculates the startup correction value Ts as a value that increases gradually with the lapse of time (S58). Specifically, the startup correction value Ts is a value that is zero when the counter Ct is zero and becomes closer to an upper limit value Tsmax as the value of the counter becomes closer to the prescribed value Cth. This can be realized, for example, by providing a map in which a relationship between the value of the counter Ct and the value of the startup correction value Ts is defined in the memory 64 in advance.

On the other hand, when it is determined that the value of the counter is equal to or greater than the prescribed value Cth (YES in S56), the CPU 62 sets the startup correction value Ts to be the upper limit value Tsmax (S60). When the processes of S58 and S60 are completed, the CPU 62 temporarily ends the process flow illustrated in FIG. 9.

Effects of this embodiment will be described below. When the ECU 60 is in the ON state, the torque command value Trq* is calculated based on the process flow illustrated in FIG. 8 and the inverter INV is operated based thereon. For example, in a state in which the steering 10 is not operated yet such as before the vehicle starts, the torque command value Trq* is zero. In this case, the operation signal g¥# is a signal for setting the torque of the motor 42 to zero while periodically turning on and off the switching element S¥# with a period Tc. In this case, the amount of heat emitted due to a current flow in the inverter INV or the motor 42 can be ignored. However, the driver 66 illustrated in FIG. 2 is driven and the switching element g¥# of the inverter INV is turned on and off with a predetermined period Tc, thereby causing emission of heat. The temperature of the lubrication target part as well as the temperature of the control board 46 can also increase due to this emission of heat, but since all the heat is not transmitted to the lubrication target part and the heat capacity of the lubrication target part is large, the increases in temperature of the lubrication target part are less than the increase in temperature of the control board 46. The startup correction value Ts is a value for compensating for a difference between the increases in temperature.

That is, in this embodiment, since the startup correction value Ts increases gradually with the lapse of time, the startup correction value appropriately represents a value by which the output value Tbc2 is higher than the temperature of the lubrication target part due to the emission of heat. Accordingly, by the decreasing correction using the startup correction value Ts, it is possible to restrain an error due to the emission of heat based on the turning on/off operations from being generated in the estimated value Tge.

The amount of heat emitted from the driver 66 and the like due to driving of the inverter INV hardly varies regardless of the value of the torque command value Trq* of the motor 42. Accordingly, in this embodiment, the increase in temperature due to the amount of heat emitted is considered to be an almost constant value and is uniformly set to the upper limit value Tsmax after a certain time elapses even when the torque command value Trq* becomes greater than zero to drive the motor 42. In this embodiment, the startup correction value Ts is set in consideration of the amount of heat emitted due to the ON state of the CPU 62 and the like in addition to the amount of heat emitted based on switching of the inverter INV.

Hereinafter, a fifth embodiment will be described below with a focus on differences from the second embodiment with reference to the drawings.

Figure 10:
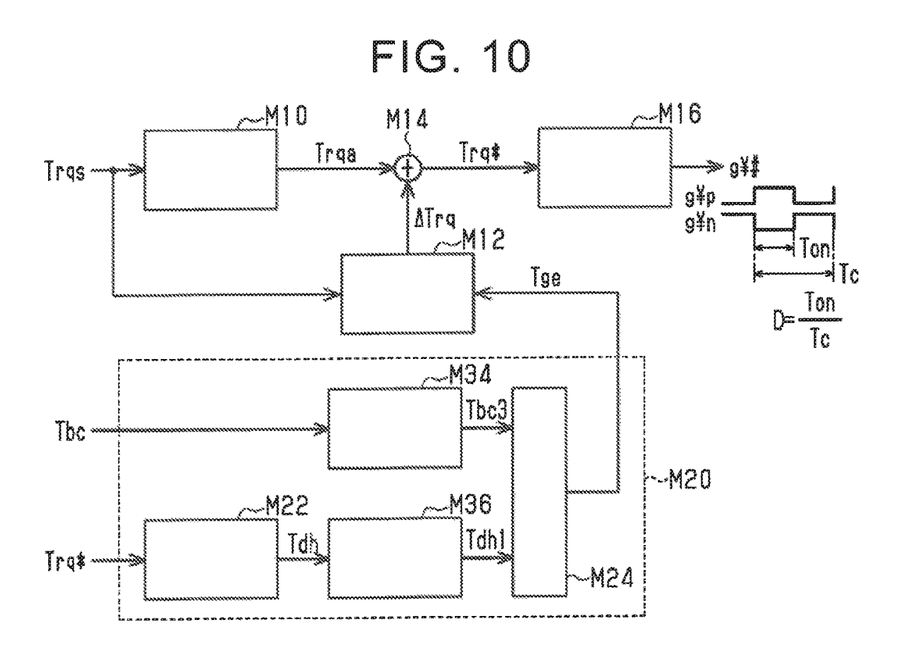
FIG. 10 is a block diagram illustrating a part of an operation signal generating process according to a fifth embodiment.

FIG. 10 illustrates a part of a process flow which is performed by the CPU 62 in accordance with a program stored in the memory 64 in the ECU 60 according to this embodiment. In FIG. 10, the processes corresponding to the process flow illustrated in FIG. 5 will be referenced by the same reference signs and description thereof will not be repeated.

As illustrated in FIG. 10, in this embodiment, the drive correction value calculating unit M22 calculates the drive correction value Tdh with the torque command value Trq* instead of the q-axis actual current iq as an input. This can be realized by replacing the actual current iq with the torque command value Trq*, replacing the threshold value iqth with a threshold value Trqth, and appropriately changing the coefficient K in the process illustrated in FIG. 4.

In this embodiment, low-pass filtering units M34 and M36 are provided instead of the low-pass filtering unit M26 illustrated in FIG. 5. The low-pass filtering unit M34 performs low-pass filtering on the detected value Tbc as an input thereof, and outputs an output value Tbc3 to the temperature correcting unit M24. The low-pass filtering unit M36 performs low-pass filtering on the drive correction value Tdh as an input and outputs an output value Tdh1 to the temperature correcting unit M24. The temperature correcting unit M24 sets a value obtained by subtracting the output value Tdh1 from the output value Tbc3 as the estimated value Tge.

Here, the low-pass filtering unit M34 performs a filtering process for expressing that the increase in temperature of the lubrication target part is delayed with respect to the increase of the detected value Tbc. On the other hand, the low-pass filtering unit M36 performs a filtering process for expressing that the increase in temperature of the lubrication target part due to the emission of heat from the motor 42 or the inverter INV is delayed with respect to the increase in temperature of the control board 46 due to the same emission of heat. Here, the low-pass filtering unit M34 and the low-pass filtering unit M36 are the same type of filters (for example, primary delay filters), but time constants thereof are different from each other in this embodiment. This is in consideration of the fact that radiant heat from the on-board motor 58 or radiant heat from the cooling system 59, and the like in addition to the emission of heat from the motor 42 or the inverter INV are present as factors for increasing the temperature of the control board 46. That is, it is considered that the delay of the increase in temperature of the lubrication target part due to such heat with respect to the increase of the detected value Tbc due to such heat may be slightly different from the delay due to the emission of heat from the motor 42 or the inverter INV.

Correspondence between the elements in the above-mentioned embodiments and the elements described in the "SUMMARY" is as follows.

The predetermined member attached to the steering mechanism corresponds to the motor unit 40. The "value obtained by low-pass filtering the subtracted value" corresponds to the estimated value Tge illustrated in FIG. 5 and the output value Tbc2 illustrated in FIGS. 6 and 8. The "value obtained by subtracting the value acquired by low-pass filtering the drive correction value from the value acquired by low-pass filtering the detected value" corresponds to the estimated value Tge illustrated in FIG. 10. The residual heat correcting process corresponds to the subtraction process using the residual heat correction value Trh in the temperature correcting unit M30 when the determination result of S40 is negative. The determination process corresponds to the process of S32. That is, when the determination result of S32 is negative, the residual heat correction value Trh is zero, the correction using the residual heat correction value Trh in the temperature correcting unit M24 is zero, and thus the residual heat correction value Trh does not contribute to calculation of the estimated value Tge. The "same space which is defined by a vehicle body" corresponds to the steering system accommodating chamber RM.

At least one element in the above-mentioned embodiments may be modified as follows. In the above-mentioned embodiments, the absolute value of the low-temperature correction value ΔTrq is set based on only the estimated value Tge, but the disclosure is not limited thereto. For example, a vehicle speed may be considered. Accordingly, the absolute value of the low-temperature correction value ΔTrq can be set in consideration of the fact that the torque required for turning the turning angle depends on the vehicle speed.

For example, the low-temperature correction value ΔTrq may be calculated using a steering angle which is a rotary angle of the steering 10 or a turning angle which is a rotary angle of the turning wheels 19. For example, this is particularly effective when a value obtained by adding a return torque which is a force for returning to a neutral position to the assist torque Trqa is a correction target which is corrected by using the low-temperature correction value ΔTrq in the torque correcting unit M14. Here, the return torque is a larger value when the magnitude of the turning angle is relatively large than when the magnitude of the turning angle is relatively small. In this case, when it is assumed that the low-temperature correction value ΔTrq is calculated as a sum of an increase correction value of the assist torque Trqa at a low temperature and an increase correction value of the return torque, the return torque can be set to be larger when the estimated value Tge is relatively small than when the estimated value is relatively large by using the low-temperature correction value ΔTrq. In this case, at least when the steering is returned to the neutral position, the magnitude of the torque of the motor 42 is larger than that at a high temperature due to the low-temperature correction value ΔTrq.

The low-temperature process does not necessarily include the process of calculating the low-temperature correction value ΔTrq. For example, a low-temperature map may be provided separately from a high-temperature map as the map which is used to set the assist torque Trqa from the steering torque Trqs in the assist torque setting unit M10.

The low-temperature process is not limited to the process of setting the magnitude of the torque command value Trq* for the motor 42 to be greater at a low temperature than at a high temperature. For example, when the motor 42 is operated to feedback control the turning angle by using a turning angle command value, a feedback gain may be set to be larger at a low temperature than at a high temperature. In this case, the torque of the motor 42 has a value determined by the feedback control, but this value is also different from the value at a high temperature. The turning angle feedback control is particularly effective when a steer-by-wire system is employed as the steering system.

The drive correction value calculating process is not limited to the process illustrated in FIG. 4 or the process described with reference to FIG. 10. For example, in the process illustrated in FIG. 4, a current command value iq* may be used as an input instead of the q-axis actual current iq. For example, a norm of a current vector (id, iq) which is determined by the q-axis actual current iq and the d-axis actual current id may be used as an input. For example, a norm of vectors of the current command values id* and iq* may be used as an input. This configuration is particularly effective, for example, when a control with the d-axis current command value id* not being set to zero such as weak field control is performed.

Instead of the process of S16 in FIG. 4, the filter output value whenever the determination result of S12 is positive may be set as the drive correction value Tdh, for example, using a primary delay filter having the drive correction value Tdh at a time point at which a state in which the determination result of S12 is negative is changed to a state in which the determination result is positive as an impulse input.

For example, a process of increasing the drive correction value when the magnitude of a current such as the q-axis actual current is equal to or greater than a first predetermined value, not updating the drive correction value when the magnitude of the current is equal to or greater than a second predetermined value which is less than the first predetermined value and less than the first predetermined value, and decreasing the drive correction value when the magnitude of the current is less than the second predetermined value may be employed. Here, when the magnitude of the current is equal to or greater than the first predetermined value, the increase in the drive correction value may be set to be larger when the magnitude of the current is relatively large than when the magnitude of the current is relatively small.

For example, an increase in temperature of the thermistor 68 may be calculated based on a heat emission parameter such as the actual current iq and the drive correction value Tdh may be calculated by multiplying the calculated increase in temperature by a gain G which is greater than "0" and equal to or less than "1." In this case, by only changing the gain G, it is possible to cope with a case in which the arrangement of the thermistor 68, the arrangement of the motor 42, the arrangement of the inverter INV, or the like is changed.

The residual heat correction value Trh is not limited to the value obtained by low-pass filtering the value acquired by subtracting the initial value Tge0 from the detected value Tbc at the time of starting calculation of the estimated value Tge. For example, under the condition that the residual heat correction value Trh is set to a value equal to or greater than zero, the residual heat correction value Trh may be set to be a value obtained by decreasing the value acquired by subtracting the initial value Tge0 from the detected value Tbc at the time of starting calculation of the estimated value Tge by a predetermined value every cycle of the calculation process may be used.

The determination process is not limited to the process of determining that the process of calculating the residual heat correction value Trh should be performed on the condition that the detected value Tbc at the time of starting the process of calculating the estimated value Tge is higher than the initial value Tge0. For example, instead of the process of S38 in FIG. 7, a process of setting the larger value of the low-pass filtered value and "0" as the residual heat correction value Trh may be performed and the above-mentioned condition may be deleted from the process of S32.

The determination process of determining that the residual heat correcting process should be performed on the condition that the detected value Tbc at the time of starting the process of calculating the estimated value Tge is higher than the outside air temperature TO which is an input is not essential. That is, for example, the time at which the process of calculating the estimated value Tge is ended and the time at which the process is started may be acquired via the communication line Ln and it may be determined that the residual heat correcting process is performed on the condition that a difference between these two period of time is equal to or less than a predetermined time.

The residual heat correcting process is not limited to the process of calculating the residual heat correction value Trh as a value obtained by low-pass filtering the value acquired by subtracting the initial value Tge0 from the detected value Tbc at the time of starting calculation of the estimated value Tge or calculating the residual heat correction value Trh as a value obtained by decreasing the "value obtained by subtracting the initial value Tge0 from the detected value Tbc at the time of starting calculation of the estimated value Tge" by a predetermined value every cycle of the calculation process on the condition that the residual heat correction value Trh is set to a value equal to or greater than zero. For example, on the condition that the initial value Tge0 is higher than the outside air temperature TO at the time of starting calculation of the estimated value Tge, the impulse input of the low-pass filtering process may be set to be "Tbc−Tge0−f(Tbc−TO)." The function f(x) is set to decrease as an independent variable x increases and the x is positive. The function f(x) is a term for setting the input value of the low-pass filtering process to be greater when the time from stop of the previous calculation process to start of the current calculation process is long than when the time from stop of the previous calculation process to start of the current calculation process is short even when "Tbc−Tge0" is the same. This is based on the thought that, since the temperature of the lubrication target part decreases when the time is long, the temperature of the lubrication target part is lower than the initial value Tge0.

The residual heat correcting process is not limited to including the residual heat correction value calculating process of calculating the residual heat correction value Trh. For example, the initial value of the estimated value Tge at the time of starting the process of calculating the estimated value Tge may be set to the initial value Tge0 at the time of stopping the process of calculating the estimated value Tge and the current estimated value Tge(n) may be set to an exponential moving average value of the previous estimated value Tge(n−1) and the estimated value Tge calculated in the process flow illustrated in FIG. 3, 5, or 10. Instead of the estimated value Tge calculated in the process flow illustrated in FIG. 5 or 10, a value obtained by subtracting the startup correction value Ts from the estimated value Tge may be used as an input of the exponential moving average process.

In the above-mentioned embodiments, the actual currents id and iq are feedback controlled according to the current command values id* and iq* which are determined from the torque command value Trq*, but the disclosure is not limited thereto. For example, so-called model prediction control of calculating predicted values of the actual currents id and iq in the next control cycle when it is assumed that a plurality of switching modes are employed based on the actual currents id and iq and employing the switching mode in which differences between the predicted values and the current command values id* and iq* become smaller for actually operating the inverter INV may be performed.

In the above-mentioned embodiments, the increase in temperature due to the amount of heat emitted due to the ON state of the CPU 62 is included in the startup correction value Ts, but this may be ignored.

The process of calculating the startup correction value Ts is not based on the premise that current feedback control is performed. For example, even when open loop control is performed, the startup correction value Ts can be effectively calculated, because emission of heat due to switching may be caused when the switching elements S¥# are turned on and off, for example, with a period Tc.

The process of calculating the startup correction value Ts is not limited to the premise of switching of the inverter INV. For example, when a converter is included as the voltage application circuit, calculation of the startup correction value Ts due to switching of the converter is effective, for example, in the following case. That is, a case in which a command value of the output line voltage of the voltage application circuit is set as an operation amount of the current feedback control and a time ratio of an ON time to one period in which the switching element of the converter is turned on and off is set depending on the output line voltage.

For example, the startup correction value Ts may be calculated by calculating the increase in temperature of the thermistor 68 with time as an input and multiplying the calculated increase in temperature by a gain G which is greater than "0" and equal to or less than "1." In this case, by only changing the gain G, it is possible to cope with a case in which the arrangement of the thermistor 68, the arrangement of the motor 42, the arrangement of the inverter INV, or the like is changed.

For example, with the CPU 62 set to the ON state regardless of whether the vehicle is in a state in which travel is possible, the process of calculating the estimated value Tge based on the drive correction value Tdh may be normally performed as illustrated in FIGS. 3, 5, and 10. At this time, the startup correction value Ts may be fixed to the upper limit value Tsmax and the estimated value Tge may be calculated further using the upper limit value.

The estimation process does not necessarily include the process of calculating the drive correction value Tdh. For example, the estimated value Tge may be calculated based on a map in which the relationship between the heat emission parameter and the detected value Tbc and the estimated value Tge is defined on the condition that the magnitude of the heat emission parameter used to calculate the drive correction value Tdh, such as the absolute value of the q-axis actual current iq, is equal to or greater than a threshold value. In this case, when the magnitude of the heat emission parameter is less than the threshold value, the estimated value Tge can be gradually decreased, for example, on the condition that the estimated value Tge is equal to or higher than the outside air temperature TO.

For example, in a case in which the steering control device performs the "model prediction control" even when the torque command value Trq* is zero, it is conceived that the switching mode is regularly fixed to a predetermined zero vector when the rotary shaft 42a does not rotate yet and the torque command value Trq* is zero. In this case, the emission of heat due to switching may be ignored until the rotary shaft 42a rotates or the absolute value of the torque command value Trq* is greater than zero after the switching has been performed once, but the startup correction value Ts may be calculated as follows instead. That is, the startup correction value Ts may be calculated by performing a process of gradually increasing the startup correction value Ts on the condition that the startup correction value Ts is equal to or less than the upper limit value Tsmax when the switching is performed in a predetermined period and gradually decreasing the startup correction value Ts on the condition that the startup correction value Ts is equal to or greater than "0" when the switching is not performed in the predetermined period.

The timing belt 28, the pulley 30, or the ball screw mechanism 26 is not necessarily provided. For example, separately from the rack-and-pinion mechanism 24, a second rack-and-pinion mechanism may be provided and the rotary shaft 42a of the motor 42 may be connected to the pinion shaft thereof via a reduction gear. In this case, the second rack-and-pinion mechanism is a lubrication target part of the steering mechanism. The steering mechanism does not necessarily include the rack shaft 22, but may be a mechanism including a ball nut.

The on-board motor 58 or the cooling system 59 is not necessarily accommodated in the same space, but the on-board motor 58 or the cooling system 59 may be accommodated in different vehicle body spaces. In this case, when the temperature sensor and the lubrication target part are accommodated in the steering system accommodating chamber RM which is the same vehicle body space, the temperature detected by the temperature sensor has a strong correlation with the temperature of the lubrication target part and thus the process of estimating the temperature of the lubrication target part based on the detected value of the temperature sensor is effective.

The temperature sensor and the lubrication target part are not necessarily accommodated in the same vehicle body space, but the temperature sensor and the lubrication target part may be accommodated in a pair of different chambers having almost the same temperature environmental condition except that they are easily affected by the heat emitted from the inverter INV or the motor 42.

The voltage application circuit is not limited to the inverter INV including the switching elements SY# that selectively connect the positive electrode and the negative electrode of the DC voltage source (the battery 50) to the terminals of the motor 42. For example, a converter that is connected to the terminals of the motor 42 and steps up and steps down the voltage of the battery 50 may be employed. In this case, by changing an output voltage of the converter in a sinusoidal shape, it is possible to apply a sinusoidal voltage to the motor 42.

The motor of the steering actuator is not limited to the synchronous electric motor. For example, an induction machine or a DC motor may be employed. The steering actuator is not limited to the configuration in which the motor 42, the drive board 44, and the control board 46 are accommodated in the same housing. For example, the motor 42 and the control board 46 may be accommodated in the same housing and the drive board 44 may be accommodated in another housing. For example, the control board 46 and the drive board 44 may be accommodated in the same housing and the motor 42 may be accommodated in another housing.

The electric power steering system is not limited to assisting turning of the turning wheels 19 using the steering actuator PSA while transmitting the steering torque Trqs input to the steering 10 to the turning wheels 19. For example, a steer-by-wire system that turns the turning wheels 19 using the steering actuator PSA in a state in which transmission of power from the steering 10 to the turning wheels 19 is intercepted may be employed.

The temperature sensor is not limited to the thermistor, but may be, for example, a diode in which a constant current flows. That is, in this case, a value of a forward voltage drop may be set as the detected value of the temperature in consideration of the temperature dependency of the magnitude of the forward voltage drop of the diode.

The arrangement of the temperature sensor is not limited to the example described in the above-mentioned embodiments. For example, when the motor 42, the drive board 44, and the control board 46 are not necessarily accommodated in the same housing, the temperature sensor may be accommodated in any one housing thereof. Here, when the housing in which the control board 46 is accommodated is different from the housing in which the motor 42 or the drive board 44 is accommodated, the control board 46 transmits an operation signal to the drive board 44 and thus is likely to be close to the drive board 44. In this case, the control board 46 is likely to be affected by the heat of the drive board 44 side. Accordingly, even when the temperature sensor is mounted on the control board 46, the correction of the detected value Tbc based on the drive correction value Tdh is effective.

Mounting of the temperature sensor on the control board 46 is not essential. For example, the temperature sensor may be attached to the housing 40a. Attachment of the temperature sensor to the housing 40a is not essential either, and the temperature sensor may be disposed separately from the housing 40a. In this case, when a distance between one of the motor 42 and the inverter INV and the temperature sensor is less than a distance between the temperature sensor and the lubrication target part, the temperature sensor is likely to be affected by heat of the motor 42 or the inverter INV and thus the correction using the drive correction value Tdh or the like is effective.

The steering control device is not limited to the configuration including the CPU 62 and the memory 64 and performing software processes. For example, the processes are performed by software in the above-mentioned embodiments, but a dedicated hardware circuit (for example, an ASIC) that performs at least some of the processes by hardware may be provided. That is, the steering control device may include a processor that performs all the processes in accordance with programs and a memory that stores the programs, may include a processor that performs some of the processes in accordance with programs, a memory that stores the programs, and a dedicated hardware circuit that performs the other processes, or may include a dedicated hardware circuit that performs all the processes.

The current sensor 69 is schematically illustrated in FIG. 2, but the current sensor 69 may actually be a shunt resistor which is disposed between the switching element S¥n and the ground, or the like.

What is claimed is:

1. A steering control device that has a steering actuator configured to turn turning wheels as an operation target, the steering actuator including a motor and a steering mechanism mechanically connected to a rotary shaft of the motor, the steering control device comprising a controller configured to perform:
    a low-temperature process of changing a torque of the motor when an estimated value estimated from a temperature of a lubrication target part of the steering mechanism is equal to or lower than a predetermined value as compared to when the estimated value estimated from the temperature of the lubrication target part of the steering mechanism is higher than the predetermined value; and
    an estimation process including:
        calculating the estimated value, which is set to be a value lower than a detected value of a temperature sensor detecting a temperature of a predetermined member attached to the steering mechanism, the estimated value being calculated based on a heat emission parameter of the steering actuator associated with a current flow at the detected value of the temperature sensor,
        calculating a drive correction value based on the heat emission parameter of the steering actuator, such that a value of the drive correction value is higher when the heat emission parameter is greater than a predetermined value, as compared to the value of the drive correction value when the heat emission parameter is equal to or less than the predetermined value, the heat emission parameter being one of a current flowing in the motor and a torque of the motor, and
        calculating the estimated value by setting a calculating value to be less than the detected value based on the drive correction value, wherein:
            the temperature sensor satisfies at least one of (i) a first condition where the temperature sensor is located in a housing in which at least one of a voltage application circuit applying a voltage to the motor and the motor is accommodated, (ii) a second condition where a temperature of the steering control device is detected, and (iii) a third condition where a shorter distance of a distance between the motor and the temperature sensor, and a distance between the voltage application circuit and the temperature sensor is also shorter than a distance between the lubrication target part and the temperature sensor.

2. The steering control device according to claim 1, wherein the steering mechanism includes a rack shaft, a part of the rack shaft is the lubrication target part, and the rack shaft and the temperature sensor are accommodated in a same space which is defined by a vehicle body.

3. The steering control device according to claim 1, wherein:
    the estimation process includes a startup correction value calculating process of calculating a startup correction value, which is a value equal to or less than a predetermined upper limit value based on an elapsed time after the steering control device starts an operation of turning on/off a switching element of the voltage application circuit, wherein the upper limit value is set as the startup correction value when the elapsed time is equal to or greater than a prescribed time; and
    the estimation process includes calculating the estimated value based on setting the calculating value to be a value causing the estimated value calculated in the estimation process to be less than the detected value based on the startup correction value and the drive correction value.

4. The steering control device according to claim 1, wherein the estimation process includes calculating the estimated value to be equal to or less than one of (i) a first value obtained by performing low-pass filtering on a subtracted value acquired by subtracting the drive correction value from the detected value, and (ii) a second value obtained by subtracting a value acquired by performing the low-pass filtering on the drive correction value from a value acquired by performing the low-pass filtering on the detected value.

5. The steering control device according to claim 1, wherein:
    when the estimation process is stopped by turning off the steering control device, the steering control device performs a storing process of storing the estimated value before the estimation process is stopped in a storage unit;
    the estimation process is restarted with startup of the steering control device;
    the estimation process includes a residual heat correcting process; and
    when the detected value, at a time of restarting the estimation process, is greater than the estimated value stored in the storing process, the residual heat correcting process includes setting the calculating value, by which the estimated value calculated in the estimation process is less than the detected value, to be greater than the calculating value calculated when the detected value, at the time of restarting the estimation process, is equal to or less than the estimated value stored in the storing process.

6. The steering control device according to claim 5, wherein the residual heat correcting process includes:
    a residual heat correction value calculating process of calculating a value by performing low-pass filtering on a value acquired by subtracting the estimated value stored in the storing process from the detected value at the time of restarting the estimation process as a residual heat correction value; and
    setting the calculating value, which is used when the estimated value calculated in the estimation process is less than the detected value, based on the residual heat correction value.

7. The steering control device according to claim 5, wherein the controller further performs:
    an outside air temperature acquiring process of acquiring an outside air temperature; and a determination process of determining to perform the residual heat correcting process when a value obtained by subtracting the acquired outside air temperature from the detected value is greater than a predetermined value, and determining not to perform the residual heat correcting process when the value obtained by subtracting the acquired outside air temperature from the detected value is equal to or less than the predetermined value at the time of restarting the estimation process.

* * * * *